United States Patent
Leah et al.

(10) Patent No.: US 9,418,575 B2
(45) Date of Patent: Aug. 16, 2016

(54) DYNAMICALLY UPDATING MAP PROJECTIONS

(75) Inventors: Robert Charles Leah, Cary, NC (US); David Mallenby, Eastleigh (GB); John Kurt Muller, Orlando, FL (US); Peter Chi-Shing Yim, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 737 days.

(21) Appl. No.: 13/411,544

(22) Filed: Mar. 3, 2012

(65) Prior Publication Data

US 2012/0169766 A1    Jul. 5, 2012

Related U.S. Application Data

(63) Continuation of application No. 12/981,020, filed on Dec. 29, 2010.

(51) Int. Cl.
*G09B 29/00*   (2006.01)
(52) U.S. Cl.
CPC .................. *G09B 29/005* (2013.01)

(58) Field of Classification Search
USPC .......................................... 345/619
See application file for complete search history.

(56) References Cited

U.S. PATENT DOCUMENTS

| | | | |
|---|---|---|---|
| 2006/0031046 A1* | 2/2006 | Asper | 703/2 |
| 2006/0206264 A1* | 9/2006 | Rasmussen | 701/212 |
| 2009/0150757 A1 | 6/2009 | Hara et al. | |
| 2010/0235089 A1* | 9/2010 | Kato | 701/201 |

FOREIGN PATENT DOCUMENTS

WO        2010068187        6/2010

* cited by examiner

*Primary Examiner* — James A Thompson
(74) *Attorney, Agent, or Firm* — Brian J. Teaque

(57) ABSTRACT

Embodiments of the invention may provide the ability to dynamically create and update map projections to reduce the spatial distortion in a desirable way for a specific map view. For example, as a map view is changed, a new central meridian may be selected and a new map projection may be created based on the selected central meridian. Dynamically updating map projections so that all map layers are correctly representing the most important spatial attributes for the given situation may enable a map analyst to correctly interpret the maps being viewed.

7 Claims, 8 Drawing Sheets

DYNAMICALLY UPDATING MAP PROJECTIONS

CROSS-REFERENCE TO RELATED APPLICATIONS

This application is a continuation of and claims priority to U.S. patent application Ser. No. 12/981,020, filed Dec. 29, 2010, the contents of which is incorporated herein by reference in its entirety.

BACKGROUND

The present invention relates to displaying maps, and more particularly to displaying dynamically updated map projections.

It is well known that representing a spherical surface (globe) onto a flat surface (computer screen or paper) results in the distortion of one or more spatial properties. A map projection works by a set of rules which dictate where locations on a globe (earth) should be located on a flat surface. While many map projections have been created, they all distort one or more of the following four spatial properties: shape, area, distance, direction. Such spatial distortion is greater in some parts of the projection than in other parts.

BRIEF SUMMARY

In one embodiment of the invention, a method for displaying map projections comprises, in response to one or more desired changes to one or more aspects of a map view, selecting a central meridian for the desired changed map view and creating a new map projection based on the selected central meridian to reduce distortion of one or more spatial properties in the desired changed map view. The one or more desired changes to one or more aspects of a map view may comprise one or more desired changes to a viewable area of the map. The one or more desired changes to a viewable area of the map may be selected using one or more of scroll, zoom, or pan controls.

The map view may comprise a line segment. If the line segment is substantially straight then the selected central meridian corresponds to the line segment. If the line segment is not substantially straight then the selected central meridian corresponds to a line that is fit to the line segment.

The map view may comprise one or more landmarks, and the selected central meridian may correspond to a line intersecting one or more of the landmarks. The map view may comprise a plurality of data points, and the selected central meridian may comprise a line of central tendency of the plurality of data points. The one or more desired changes to one or more aspects of a map view may comprise one or more desired changes to a selection of data from a dataset.

In addition to the method of displaying map projections, as described above, other aspects of the present invention are directed to corresponding systems and computer program products for displaying map projections.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
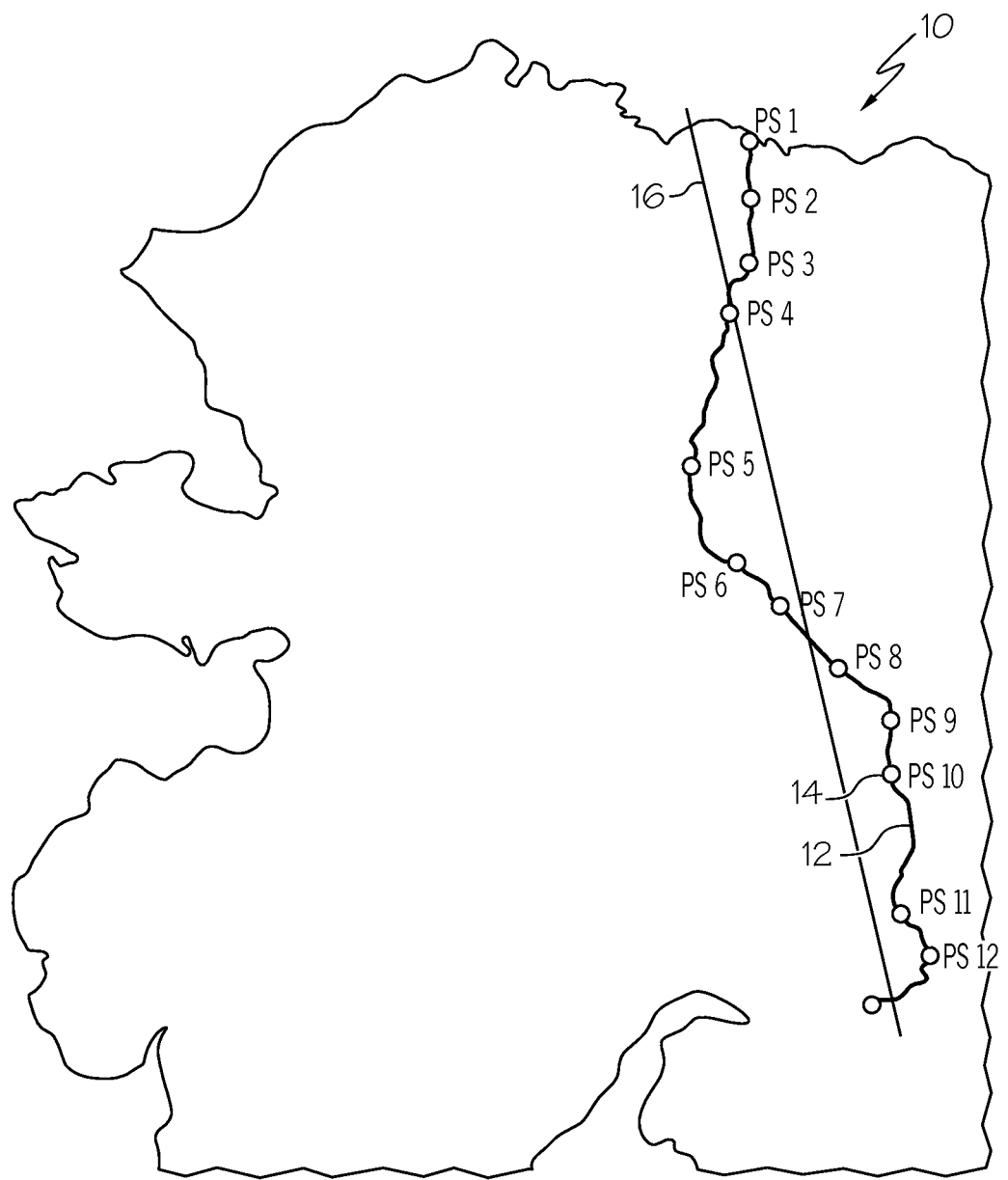
FIGS. 1-6 are map projections illustrating the operation of dynamically displaying map projections according to various aspects of the present invention.

Embodiments of the invention may provide the ability to dynamically create and update map projections to reduce the spatial distortion in a desirable way for a specific map view. For example, when working with a Transverse Mercator projection, a central meridian may be selected to reduce distance along the line segment of most interest for a specific map view. As a map view is changed (such as, for example, in response to a user selection as discussed in more detail below), a new central meridian may be selected and a new map projection may be created based on the selected central meridian. Dynamically updating map projections so that all map layers are correctly representing the most important spatial attributes for the given situation may enable a map analyst to correctly interpret the maps being viewed.

The specific type of map projection that may be created may vary, such as according to the spatial property which is desired to be less distorted. For example, if it is desired to accurately display distance along the central meridian, it may be desirable to create a Transverse Mercator projection. However, any known type of projection may be created using embodiments of the invention. For example, an Albers Equal Area Conic projection may be dynamically created using embodiments of the present invention. The Albers Equal Area Conic projection preserves angles between meridians and parallels. The Albers Equal Area Conic projection attempts to minimize distortion for both shape and linear scale, but neither is truly correct. Another projection that may be dynamically created using embodiments of the present invention is the Chamberlin Trimetric projection which is used by the National Geographic Society for mapping most continents. The Chamberlin Trimetric projection is a three-point equidistant projection, which preserves the distance between three reference points relative to any other point. Another projection that may be dynamically created using embodiments of the present invention would be a conformal map projection which is used for maps where the measurement of angles is important, such as aeronautical charts and topographic maps. Hundreds of projections have been developed in order to accurately represent a particular map element or to best suit a particular type of map or task.

The central meridian that is selected may be chosen to reduce the spatial distortion in a desirable way for a specific map view. For example, one type of map might illustrate specific information as one or more (straight or non-straight) lines. Such information may include roadways, rivers, travel directions (e.g., turn-by-turn driving directions, planned aircraft flight routes, or planned shipping routes), train tracks, pipelines, communication cables, power lines, etc. For such a map, the central meridian may be selected to correspond to the one or more lines (as discussed in more detail below).

A different type of map might illustrate specific information as one or more points. For example, the points might represent geographic locations (e.g., places of interest or points along turn-by-turn driving directions), or may represent data points (e.g., crime data, population demographics, etc.) For such a map, the central meridian may be selected to correspond to one or more of the points (as discussed in more detail below).

Figure 4:
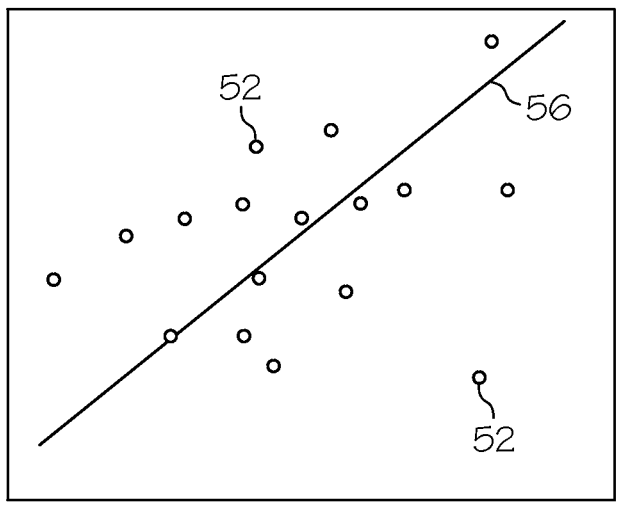
Figure 5:
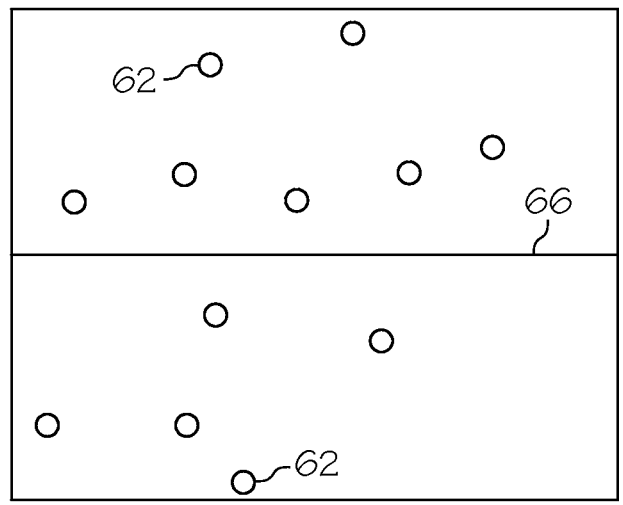

A new central meridian may be selected and a new map projection created using the new central meridian as needed in order to display a map view to a user that has reduced spatial distortion. For example, a new central meridian may be selected and a new map projection created using the new central meridian in response to one or more desired changes to one or more aspects of a map view. Changes to a map view may comprise, for example, changes to a viewable area of the map. Such changes to the viewable area occur in response to, for example, a user scrolling a map view, zooming in or out, or panning Such viewing controls are well known in the art. Changes to a map view may also comprise, for example, changing one or more filter selections which in turn change the data points displayed on a map. Such a change to a map view is illustrated in FIGS. 4 and 5 and discussed in more detail below.

Referring now to FIG. 1, map view 10 shows the state of Alaska and the Trans Alaska Pipeline 12. Pumping stations 14 along the pipeline are also shown. Map view 10 comprises a map projection that uses line 16 as the central meridian. Map view 10 may be, for example, a Transverse Mercator projection. Central meridian 16 may be selected to correspond to the illustrated portion of the pipeline (which in FIG. 1 is the entire pipeline). To select a central meridian that corresponds to a map feature that appears as a line (such as the pipeline of FIG. 1), if the line is substantially straight then the selected central meridian corresponds to the line, and if the line is not substantially straight then the selected central meridian corresponds to a line that is fit to the non-straight line using any suitable line-fitting method. Since the pipeline of FIG. 1 is not a straight line, a straight line 16 is fit to the non-straight line 12 of the pipeline (using any suitable line fitting technique) and the straight line 16 is used as the central meridian. If the illustrated portion of the pipeline were a substantially straight line, the line illustrating the pipeline could be used as the central meridian.

Figure 2A:
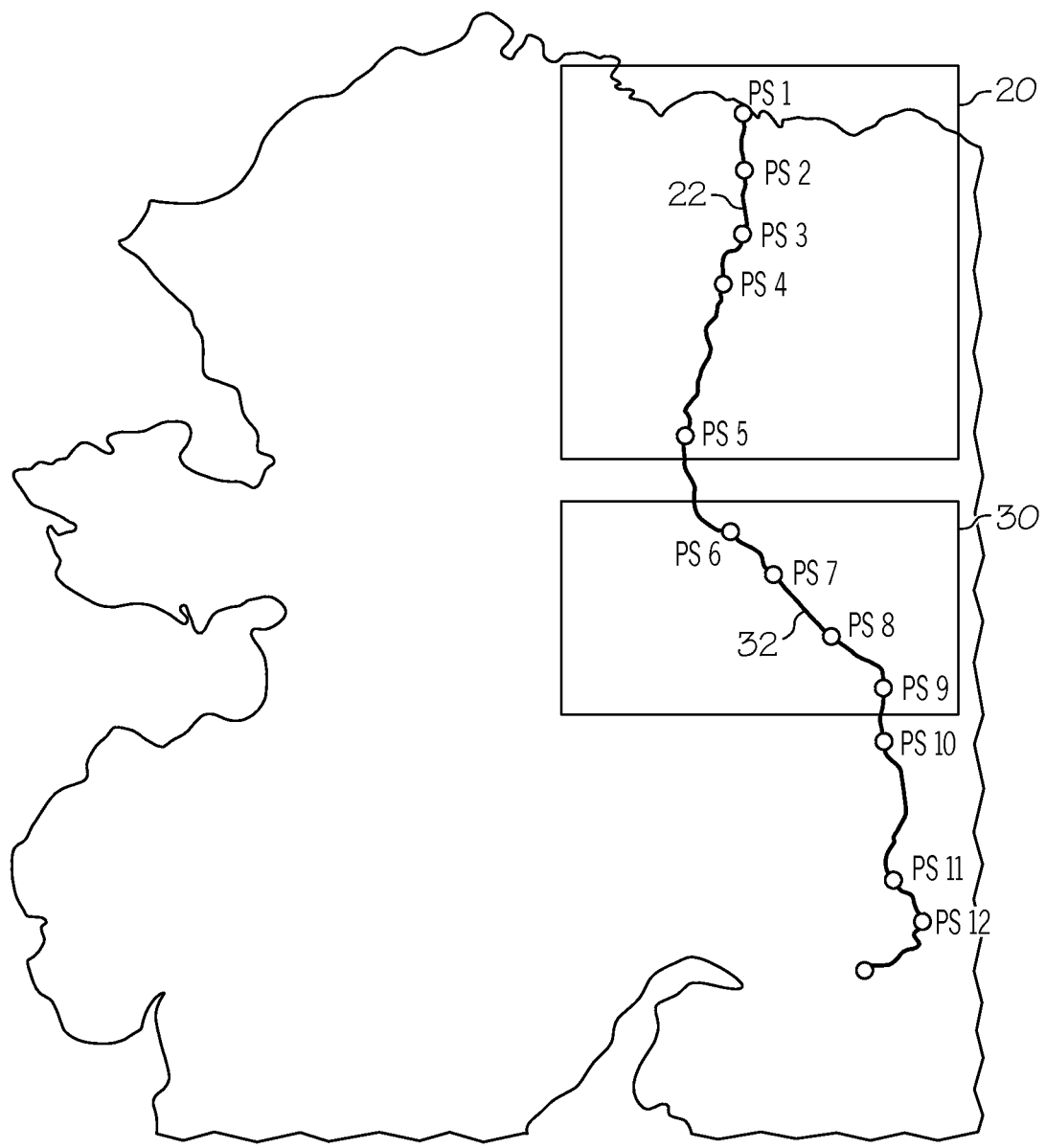

A user viewing map view 10 of FIG. 1 might desire to zoom in to view a portion of the pipeline in more detail, thereby changing the map view as the user zooms in. Embodiments of the invention may select a new central meridian and create a new map projection using the new central meridian to reduce the spatial distortion near the portion of the pipeline in the zoomed-in view. FIG. 2 illustrates how different central meridians may be selected when different portions of the pipeline are zoomed in to. Block 20 of FIG. 2a illustrates how a portion of the pipeline from pumping station 1 to pumping station 5 might be selected to zoom in to. Similarly, block 30 in FIG. 2a illustrates how a portion of the pipeline from pumping station 6 to pumping station 9 might be selected to zoom in to. The portions encompassed in blocks 20 and 30 would be selected for zoom using any suitable technique.

Figure 2B:
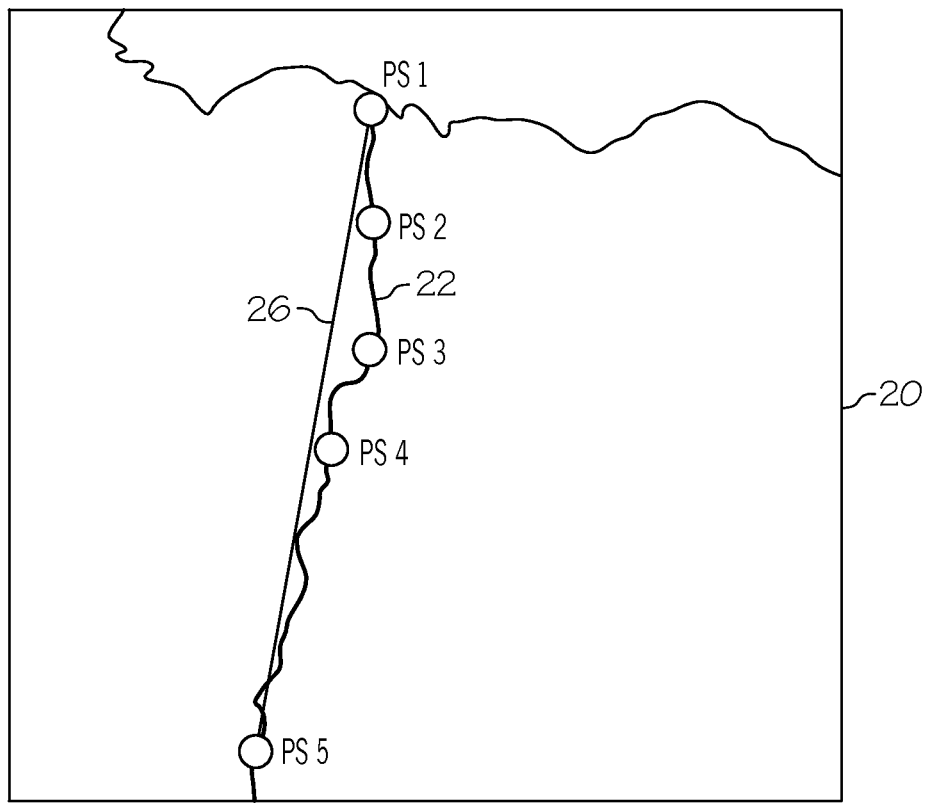

Until the map view is changed by zooming in to block 20 or block 30, the map view of FIG. 2a is the same as that of FIG. 1a and would have the same central meridian (line 16). When, for example, a user selects block 20 to zoom in, the map view would change accordingly to that illustrated in FIG. 2b. In accordance with embodiments of the invention, a new central meridian may be selected for the map view of FIG. 2b to correspond to the portion of the pipeline that is shown in FIG. 2b (i.e., pumping station 1 to pumping station 5). Since that portion of the pipeline is not a straight line, the central meridian would likely comprise a straight line 26 that has been fit to the pipeline. The projection used for the map view of FIG. 2b would be dynamically changed to use line 26 as the central meridian. As such, the map projection of FIG. 2b would have a central meridian that corresponds to the illustrated portion of the pipeline and therefore the illustrated portion of the pipeline in FIG. 2b will have less spatial distortion than would otherwise be if the map projection had not been dynamically updated in accordance with embodiments of the invention.

Figure 2C:
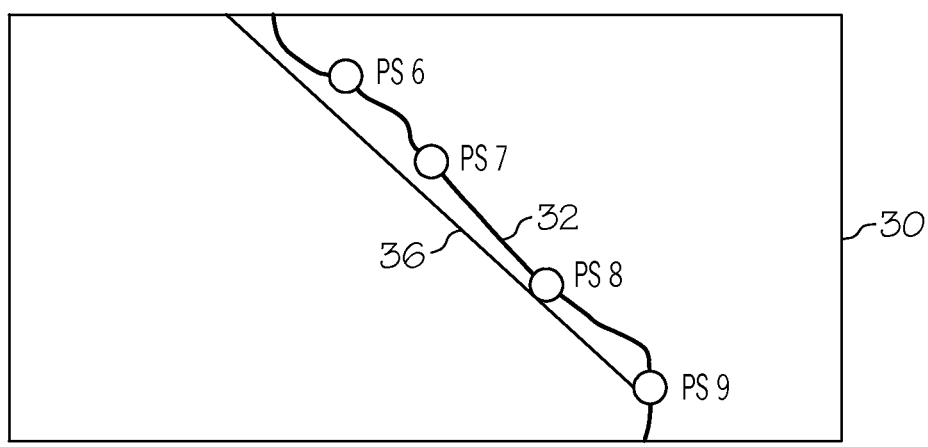

Similarly, when a user selects block 30 to zoom in, the map view would change accordingly to that illustrated in FIG. 2c. In accordance with embodiments of the invention, a new central meridian may be selected for the map view of FIG. 2c to correspond to the portion of the pipeline that is shown in FIG. 2c (i.e., pumping station 6 to pumping station 9). Since that portion of the pipeline is not a straight line, the central meridian would likely comprise a straight line 36 that has been fit to the pipeline. The projection used for the map view of FIG. 2c would be dynamically changed to use line 36 as the central meridian. As such, the map projection of FIG. 2c would have a central meridian that corresponds to the illustrated portion of the pipeline and therefore the illustrated portion of the pipeline in FIG. 2c will have less spatial distortion than would otherwise be if the map projection had not been dynamically updated in accordance with embodiments of the invention.

Figure 3A:
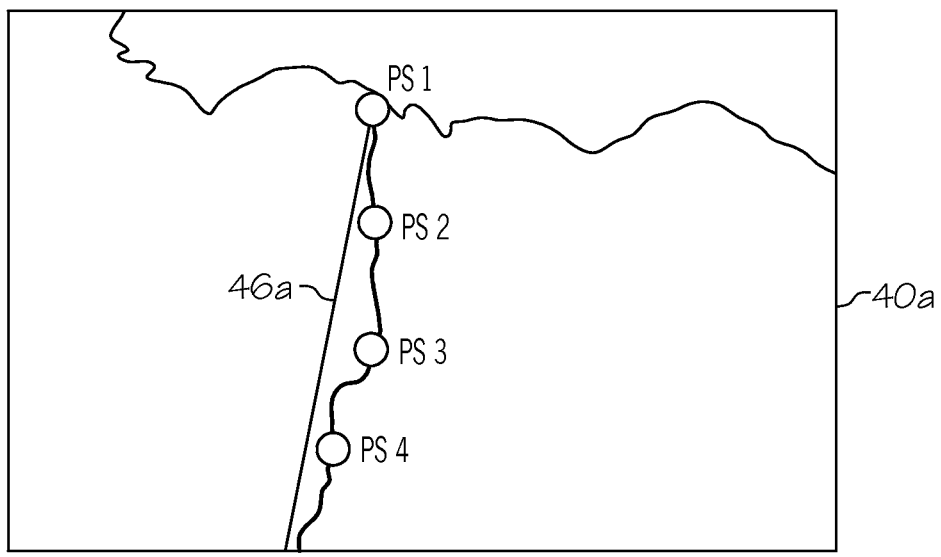
Figure 3B:
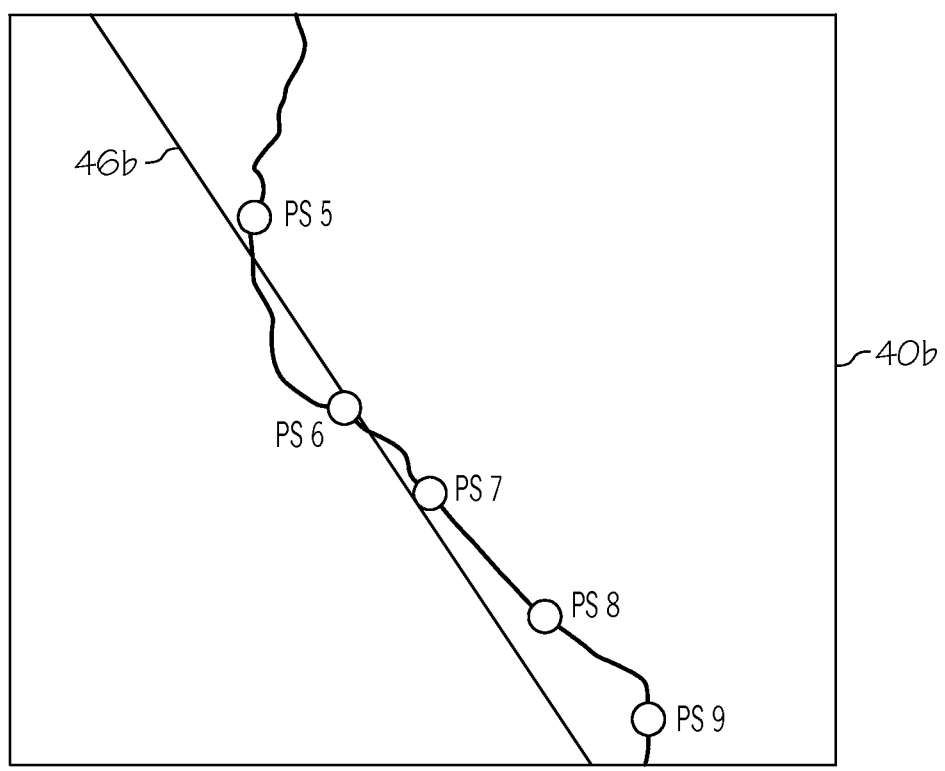
Figure 3C:
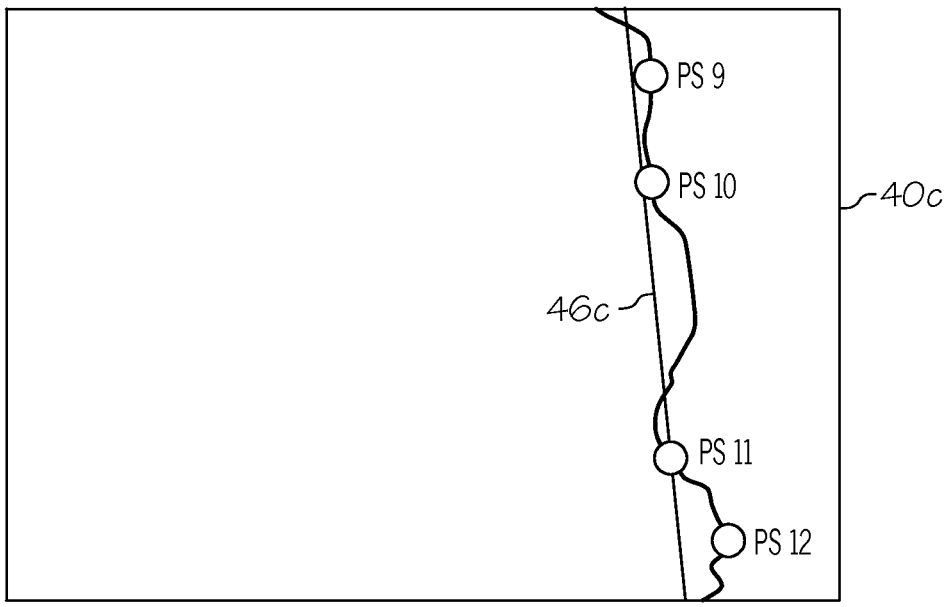

A user viewing zoomed-in map view 20 of FIG. 2b might desire to scroll down to view the rest of the pipeline at that zoom level, thereby changing the map view with each scroll increment as the user scrolls down. Embodiments of the invention may select a new central meridian and create a new map projection using the new central meridian to reduce the spatial distortion near the portion of the pipeline viewable in each current scroll window. FIG. 3 illustrates how different central meridians may be selected when different portions of the pipeline are scrolled to. FIGS. 3a, 3b and 3c each illustrate a different portion of the pipeline as a user scrolls down. FIG. 3a illustrates the pipeline from pumping station 1 to pumping station 4; FIG. 3b illustrates the pipeline from pumping station 5 to pumping station 9; and FIG. 3c illustrates the pipeline from pumping station 8 to pumping station 12. In each discrete map view which is shown as a user scrolls, a new central meridian may be selected and a new map projection created using the new central meridian dynamically for each map view. The map view illustrated in FIG. 3a would comprise a map projection created using line 46a as central meridian. The map view illustrated in FIG. 3b would comprise a map projection created using line 46b as central meridian. The map view illustrated in FIG. 3c would comprise a map projection created using line 46c as central meridian. As such, the illustrated portions of the pipeline in FIGS. 3a, 3b and 3c will have less spatial distortion than would otherwise be if the map projection had not been dynamically updated in accordance with embodiments of the invention.

Figure 6:
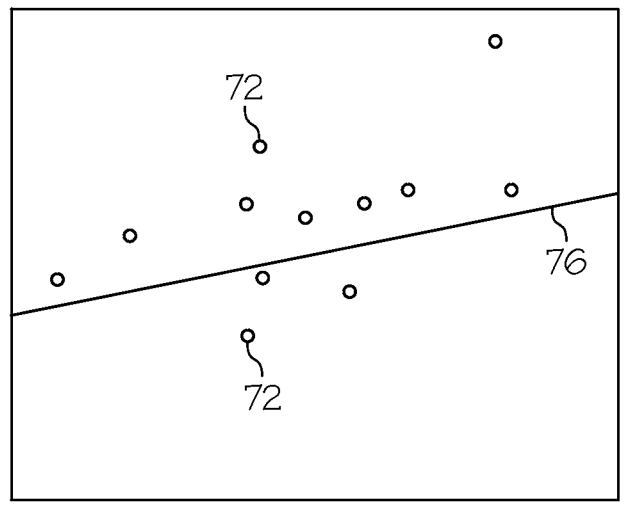

As discussed above, a different type of map might illustrate specific information as one or more points, such as data points. For such a map, the central meridian may be selected to correspond to one or more of the points. For example, the selected central meridian might correspond to a line of central tendency of a plurality of data points. Alternatively, any desired alternative technique for fitting a straight line to points may be used. FIGS. 4-6 illustrate such a type of map, with dynamically selected central meridians and dynamically created map projections in accordance with embodiments of the invention. FIGS. 4-6 could illustrate, for example, crime statistics where each data point 52 represents a recorded crime at a specific geographic location. Slider bars (or any other suitable selection mechanism) could be used to enable a user to filter data from a dataset and thereby control what and how much data is displayed. For example, slider bars 54 include selections for "income range," "date range," and "zoom." As one or more of these slider bars are changed by a user, the map view (and specifically the data points displayed)

change accordingly. In accordance with embodiments of the invention, as the map view changes in response to changes to the slider bars, a new central meridian is selected and a new map projection is created using the new central meridian.

FIG. 4 illustrates a plurality of data points 52 based on the settings of slider bars 54. A central meridian 56 may be selected based on these data points. For example, central meridian 56 may correspond to a line of central tendency of the data points. Alternatively, any desired alternative technique for fitting a straight line to points may be used. The map projection of FIG. 4 would use central meridian 56.

FIG. 5 illustrates a plurality of data points 62 based on the settings of slider bars 64. The zoom slider bar of FIG. 5 has been changed (such as by a user) to increase the zoom level. As such, fewer data points are visible in FIG. 5 than in FIG. 4. In accordance with embodiments of the invention, a new central meridian 66 is dynamically selected based on the data points that are visible in FIG. 5 and a new map projection is dynamically created based on the new central meridian. As in FIG. 4, central meridian 66 of FIG. 5 may correspond to a line of central tendency of the data points, or any desired alternative technique for fitting a straight line to points may be used.

FIG. 6 illustrates a plurality of data points 72 based on the settings of slider bars 74. The zoom slider bar of FIG. 6 has been changed (such as by a user) to decrease the income range and increase the date range. In this illustration, these changes resulted in fewer data points being visible in FIG. 6 than in FIG. 4. In accordance with embodiments of the invention, a new central meridian 76 is dynamically selected based on the data points that are visible in FIG. 6 and a new map projection is dynamically created based on the new central meridian. As in FIG. 4, central meridian 76 of FIG. 6 may correspond to a line of central tendency of the data points, or any desired alternative technique for fitting a straight line to points may be used.

Embodiments of the invention may dynamically select a central meridian based on heuristic points of value. The map projection could be continuously and dynamically altered to a human recognizable central meridian. For example, embodiments of the invention may be used when a map view comprises one or more landmarks, such that the dynamically selected central meridian corresponds to a line intersecting one or more of the landmarks or other recognizable artifact. Such an embodiment reduces spatial distortion for human meaningful artifacts by "pushing" spatial distortion to the "less meaningful" areas of the map projection.

Embodiments of the invention may dynamically select a central meridian and dynamically create a map projection using the selected central meridian for each trip segment of a mapped journey. Such a journey may be, for example, by car (in which case each trip segment may correspond to a road on which the car is to be driven, in accordance with "turn-by-turn" directions) or by airplane (in which case each trip segment may correspond to a flight "leg"). By dynamically changing the "central meridian" for each turn in a trip, the distortion of distance for that segment of the trip is eliminated.

As an example, consider travel from point A to point D, with midpoints B and C along the route. Such travel could comprise, for example, flights from Charlottesville, Va. airport (CLT) to Washington Dulles airport (IAD), from IAD to Los Angeles airport (LAX), and from LAX to Honolulu airport (HNL). As each segment of that trip is to be displayed, a new map projection for each trip segment is dynamically created using a central meridian that corresponds to the line representing the trip segment. (As discussed above, if the trip segment line is not substantially straight then the central meridian may need to be "fit" to the trip segment line.) So for a trip going from point A to point B to point C to point D, three map projections may be dynamically created to display each trip segment. The line representing trip segment AB (or a line fit to that line) would be the central meridian for the first map projection. The line representing trip segment BC (or a line fit to that line) would be the central meridian for the second map projection. The line representing trip segment CD (or a line fit to that line) would be the central meridian for the third map projection.

Further embodiments of the invention may dynamically select a central meridian and dynamically create a map projection using the selected central meridian when a map view is to be changed according to task to be performed (e.g., comparing land parcel sizes versus analyzing crime data depicted as point symbols). Embodiments of the invention may dynamically select a central meridian and dynamically create a map projection using the selected central meridian when a map view is to be changed in any desired way.

Figure 7:
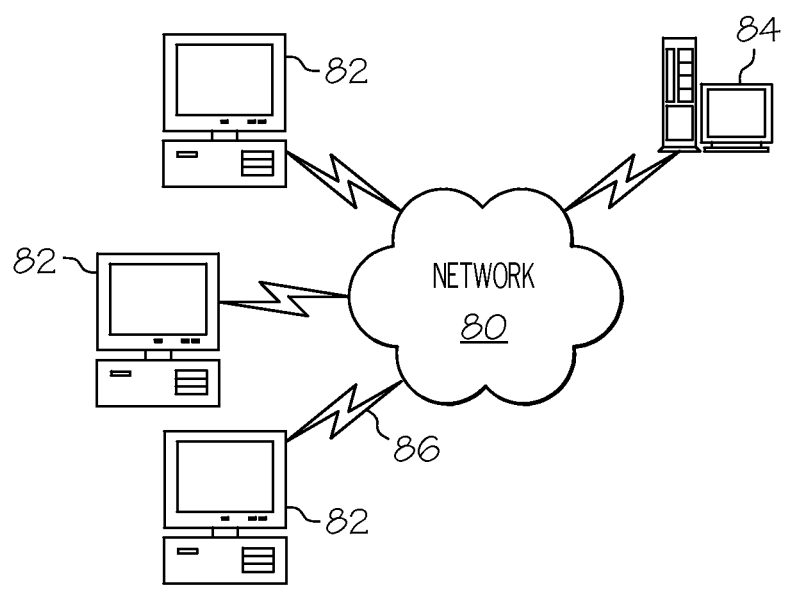
FIG. 7 is a schematic block diagram of a computer network in which embodiments of the present invention may operate.

FIG. 7 is a schematic block diagram of a computer network in which embodiments of the present invention may operate. Computers 82 and server 84 provide processing, storage, and input/output devices executing application programs and the like. Computers 82 may be linked over communication link 86 through communications network 80 to each other and to other computing devices, including server 84. Communications network 80 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. However, computers 82 and server 84 may be linked over any suitable communication network. In the system of FIG. 7, computers 82 may be running Web browsers used for accessing and viewing mapping applications, such as may be hosted on server 84.

In addition to the client-server arrangement of FIG. 7, embodiments of the invention may operate in any client-server arrangement or in any networked arrangement in which display elements, data, and/or other information are sent from a source to a recipient. For example, embodiments of the invention may operate in a mobile communications/data architecture (such as a mobile telecommunications network adhering to the International Mobile Telecommunications-2000 (also termed 3G) standards), in which a mobile telecommunications device (e.g., cell/mobile telephone) is the recipient.

Figure 8:
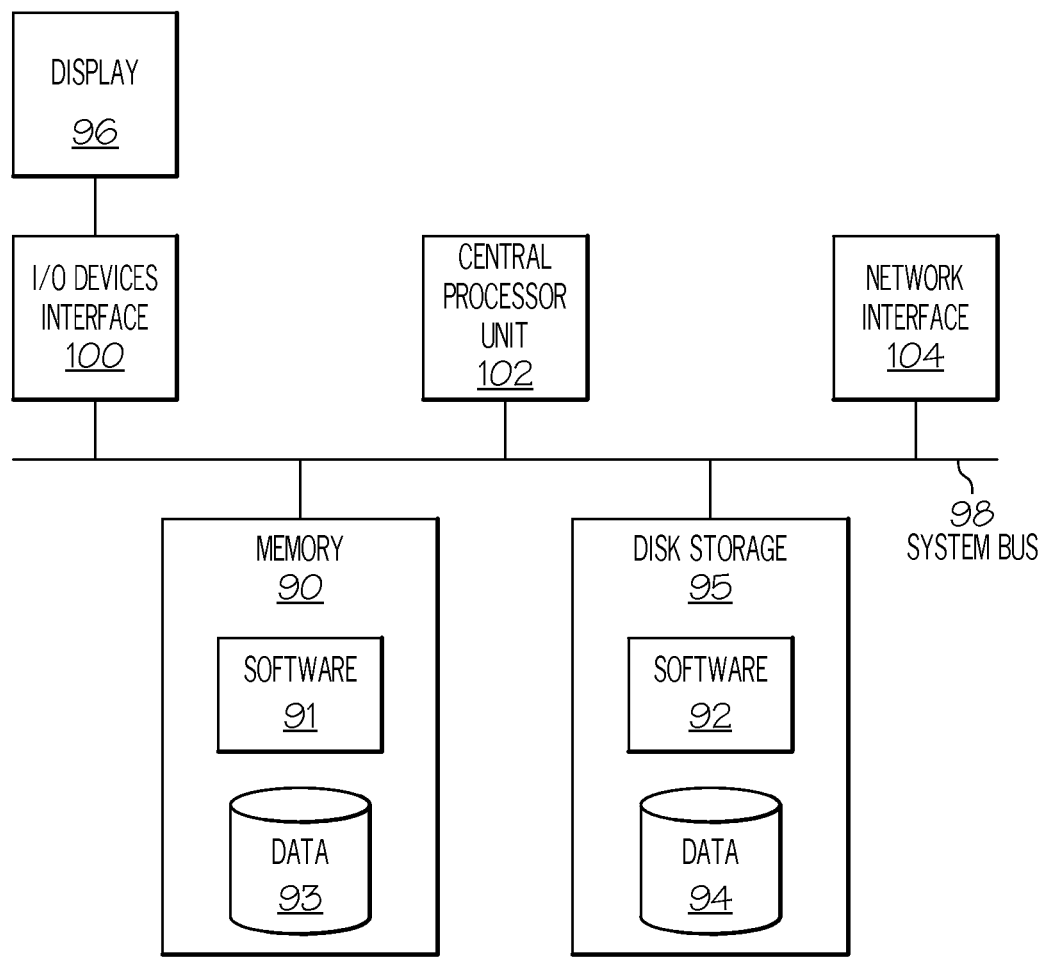
FIG. 8 is a schematic block diagram of a computer in the network of FIG. 7.

FIG. 8 is a diagram of the internal structure of a computer (e.g., computers 82 or servers 84) in the computer network of FIG. 7. Each computer typically contains system bus 98, where a bus is a set of hardware lines used for data transfer among the components of a computer. Bus 98 is essentially a shared conduit that connects different elements of a computer system (e.g., processor, disk storage, memory, input/output ports, network ports, etc.) that enables the transfer of information between the elements. Attached to system bus 98 is I/O device interface 100 for connecting various input and output devices (e.g., displays 96, printers, speakers, etc.) to the computer. Network interface 104 allows the computer to connect to various other devices attached to a network (e.g., network 80 of FIG. 7). Memory 90 provides volatile storage for computer software instructions 91 and data 93 used to implement an embodiment of the present invention. Disk storage 95 provides non-volatile storage for computer software instructions 92 and data 94 used to implement an embodiment of the present invention. Central processor unit 102 is also attached to system bus 98 and provides for the execution of computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method for displaying map projections, the method being implemented by a computer, the method comprising:
   in response to one or more desired changes to one or more aspects of a map view, selecting a central meridian for the desired changed map view; and
   creating a new map projection based on the selected central meridian, wherein the new map projection has one or more differences in distortion from a prior map projection based on a prior central meridian.

2. The method of claim 1, wherein the one or more desired changes to one or more aspects of a map view comprises one or more desired changes to a viewable area of the map.

3. The method of claim 2, wherein one or more desired changes to a viewable area of the map are selected using one or more of scroll, zoom, or pan controls.

4. The method of claim 2, wherein the map view comprises a line segment, wherein if the line segment is substantially straight then the selected central meridian corresponds to the line segment, and wherein in the line segment is not substantially straight then the selected central meridian corresponds to a line that is fit to the line segment.

5. The method of claim 2, wherein the map view comprises one or more landmarks, and wherein the selected central meridian corresponds to a line intersecting one or more of the landmarks.

6. The method of claim 1, wherein the map view comprises a plurality of data points and wherein the selected central meridian comprises a line of central tendency of the plurality of data points.

7. The method of claim 6, wherein the one or more desired changes to one or more aspects of a map view comprises one or more desired changes to a selection of data from a dataset.

* * * * *